(12) United States Patent
You

(10) Patent No.: US 11,598,438 B1
(45) Date of Patent: Mar. 7, 2023

(54) FAUCET PIPE FITTING ASSEMBLY, FAUCET CONNECTING STRUCTURE AND FAUCET

(71) Applicant: Youshi (Xiamen) Sanitary Ware Industrial Co, Ltd., Fujian (CN)

(72) Inventor: Zhangsen You, Xiamen (CN)

(73) Assignee: YOUSHI (XIAMEN) SANITARY WARE INDUSTRIAL CO, LTD., Fujian (CN)

( * ) Notice: Subject to any disclaimer, the term of this patent is extended or adjusted under 35 U.S.C. 154(b) by 0 days.

(21) Appl. No.: 17/506,686

(22) Filed: Oct. 21, 2021

(51) Int. Cl.
  *F16K 5/08*  (2006.01)
  *E03C 1/02*  (2006.01)
  *F16K 11/00* (2006.01)
  *E03C 1/04*  (2006.01)

(52) U.S. Cl.
  CPC .......... *F16K 19/006* (2013.01); *E03C 1/0403* (2013.01); *F16K 5/08* (2013.01); *E03C 1/025* (2013.01)

(58) Field of Classification Search
  CPC .................................. F16K 5/08; F16K 19/006
  See application file for complete search history.

(56) References Cited

U.S. PATENT DOCUMENTS

| 2008/0277003 | A1* | 11/2008 | Mueller | E03C 1/0401 137/801 |
| 2009/0189108 | A1* | 7/2009 | Ritter | B23P 15/001 251/304 |
| 2013/0020794 | A1* | 1/2013 | Stokes | E03C 1/0403 285/8 |
| 2016/0376775 | A1* | 12/2016 | Tasserit | E03C 1/0403 137/801 |
| 2020/0318326 | A1* | 10/2020 | Lu | E03C 1/025 |
| 2020/0326005 | A1* | 10/2020 | Lin | E03C 1/0403 |
| 2020/0333812 | A1* | 10/2020 | Huck | G05D 23/1353 |

* cited by examiner

*Primary Examiner* — Kevin R Barss
(74) *Attorney, Agent, or Firm* — Leong C. Lei

(57) ABSTRACT

A faucet pipe fitting assembly, a faucet connecting structure and a faucet are disclosed. A faucet pipe fitting assembly includes a pipe joint unit and at least two pipes. The pipe joint unit has joint portions corresponding in number to the pipes. The pipes are integrally formed with the pipe joint unit. The pipes communicate with the joint portions of the pipe joint unit, respectively. The faucet pipe fitting assembly has the advantages of stable connection and convenient connection with a valve seat.

6 Claims, 10 Drawing Sheets

FAUCET PIPE FITTING ASSEMBLY, FAUCET CONNECTING STRUCTURE AND FAUCET

BACKGROUND OF THE INVENTION

1. Field of the Invention

The present invention relates to a faucet, and more particularly to a faucet pipe fitting assembly, a faucet connecting structure and a faucet.

2. Description of the Prior Art

In the prior art, the valve seat of a faucet needs to be connected to the faucet pipe for water to flow in and out. Faucet pipe fittings generally include pipe joints and pipes connected to the pipe joints. The pipe joints and the pipes are formed separately and then assembled together. Generally, there are two connection methods for connecting the pipe and the pipe joint. The first connection method is to connect the pipe and the pipe joint through a metal sleeve. The pipe is first sleeved on the pipe joint, and then the pipe is clamped on the pipe joint with the metal sleeve. The second connection method is to weld the pipe and the pipe joint by ultrasonic welding.

When the conventional faucet pipe fittings are to be connected with the valve seat of the faucet and other devices (such as the connector of the water supply pipe, the faucet spout), the faucet pipe fittings will inevitably be subjected to a torsion force. The torsion force may make the pipe rotatable relative to the pipe joint. This causes the connection between the pipe and the pipe joint of the faucet pipe fitting using the above two connection methods to be easily loosened or even separated, resulting in water leakage of the faucet pipe fittings and affecting the use of the faucet.

In addition, in the prior art, the valve seat of the faucet requires at least two faucet pipe fittings for water to flow in and out. In general, the pipe joint of the faucet pipe is threadedly connected to the valve seat port of the valve seat. In this way, the faucet pipe fittings are connected to the valve seat one by one for the pipes of the faucet pipe fitting to communicate with the valve seat. It is troublesome for installation.

SUMMARY OF THE INVENTION

The primary object of the present invention is to provide a faucet pipe fitting assembly, a faucet connecting structure and a faucet, so as to overcome the deficiencies in the prior art.

In order to achieve the above object, the present invention adopts the following technical solutions:

A faucet pipe fitting assembly comprises a pipe joint unit and at least two pipes. The pipe joint unit has joint portions corresponding in number to the pipes. The pipes are integrally formed with the pipe joint unit. The pipes communicate with the joint portions of the pipe joint unit, respectively.

Preferably, the pipe joint unit and the respective pipes are formed in a single injection molding process.

Alternatively, the pipe joint unit and the respective pipes are formed in a two-shot injection molding process.

A faucet connecting structure comprises a valve seat and the foregoing faucet pipe fitting assembly. The valve seat has valve seat ports corresponding in number to the pipes of the faucet pipe fitting assembly. The valve seat ports each have an opening facing downward. The joint portions of the pipe joint unit of the faucet pipe fitting assembly are inserted into the respective valve seat ports of the valve seat in a lower-to-upper direction. The pipe joint unit is connected to the valve seat through a connecting member.

Preferably, the connecting member is a hook member. The hook member includes an open ring and at least two engaging hooks connected to the open opening. The valve seat has engaging portions corresponding in number to the engaging hooks of the hook member. The pipe joint unit has a stop flange. The open ring of the hook member is sleeved on the pipe joint unit and the open ring abuts against an underside of the stop flange of the pipe joint unit. The engaging hooks of the hook member hook tops of the engaging portions of the valve seat, respectively.

Preferably, a side wall of each joint portion of the pipe joint unit of the faucet pipe fitting assembly is formed with an engaging groove. A side wall of each valve seat port of the valve seat is formed with a receiving groove. The connecting member is a plug-in member. The plug-in member has plug-in pieces to be mated with the respective joint portions of the pipe joint unit. The plug-in pieces of the plug-in member are inserted into the engaging grooves of the joint portions from the receiving grooves of the valve seat ports, respectively.

Preferably, the plug-in pieces of the plug-in member are arranged in a same direction.

Alternatively, the connecting member is a screw. The pipe joint unit has a stop flange. The screw is inserted through the stop flange and is locked to the valve seat.

Preferably, the pipe joint unit has a positioning notch, and the valve seat has a positioning protrusion to be inserted into the positioning notch.

A faucet comprises the foregoing faucet connecting structure.

With the above technical solutions, the present invention has the following features:

1. In the present invention, the pipes of the faucet pipe fitting assembly are integrally formed with the pipe joint unit. In this way, when the faucet pipe fitting assembly is subjected to a torsion force, the pipes and the pipe joint unit are not easily broken and separated, thereby overcoming the unstable connection of the conventional faucet pipe fittings.

2. In the present invention, the faucet pipe fitting assembly comprises the pipe joint unit and the at least two pipes, and the pipes communicate with the joint portions of the pipe joint unit, respectively. In this way, the faucet pipe fitting assembly of the present invention is equivalent to integrating at least two existing faucet pipes, thereby overcoming the problem of inconvenience in installation that the existing faucet pipes are connected to the valve seat one by one.

DETAILED DESCRIPTION OF THE PREFERRED EMBODIMENTS

Figure 1:
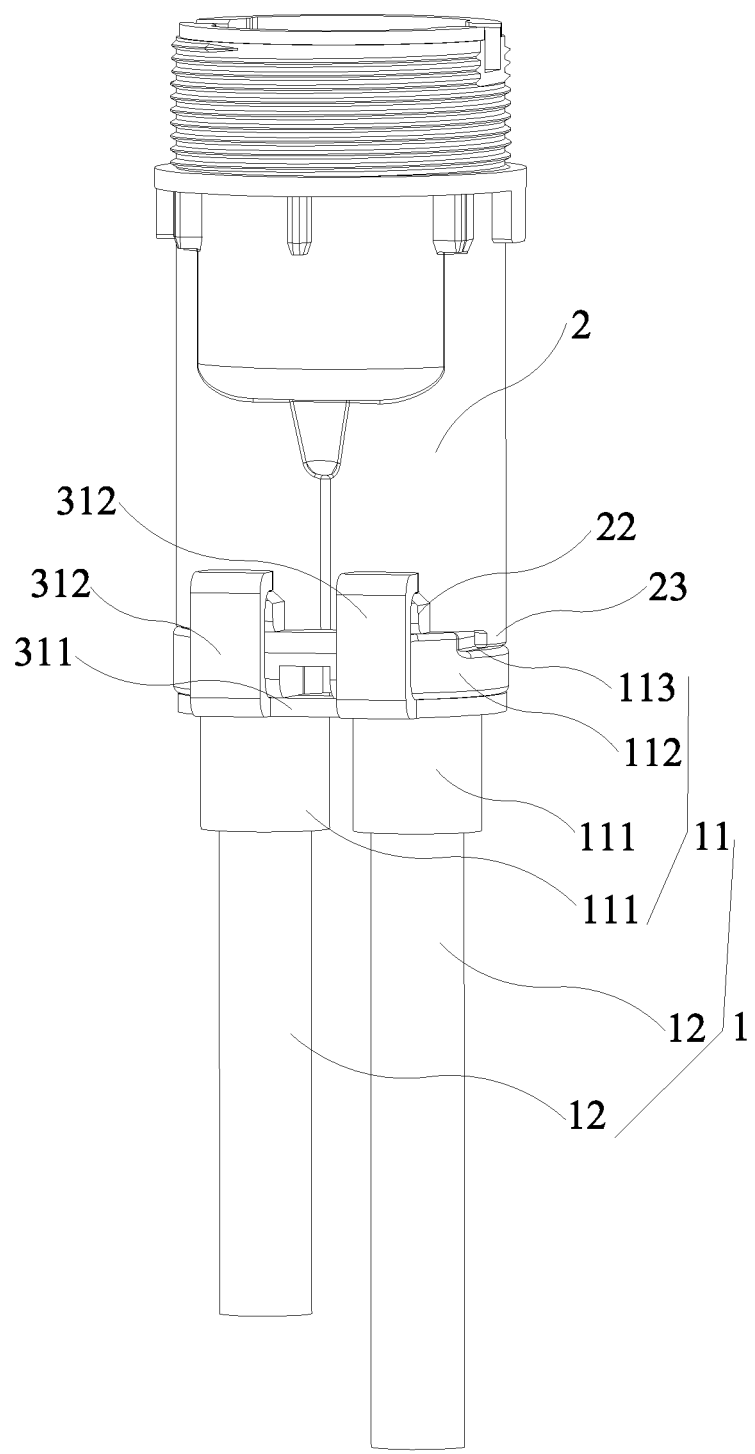
FIG. 1 is a schematic view of the faucet connecting structure according to a first embodiment of the present invention.

Embodiments of the present invention will now be described, by way of example only, with reference to the accompanying drawings.

As shown in FIG. 1 through FIG. 9, the present invention discloses a faucet pipe fitting assembly 1, comprising a pipe joint unit 11 and at least two pipes 12.

The pipe joint unit 11 has joint portions 111 corresponding in number to the pipes 12. The pipes 12 are integrally formed with the pipe joint unit 11. The pipes 12 communicate with the joint portions 111 of the pipe joint unit 11, respectively.

In the present invention, the pipes 12 of the faucet pipe fitting assembly 1 are integrally formed with the pipe joint unit 11. In this way, when the faucet pipe fitting assembly 1 is subjected to a torsion force, the pipes 12 and the pipe joint unit 11 are not easily broken and separated, thereby overcoming the unstable connection of the conventional faucet pipe fittings. Besides, the faucet pipe fitting assembly 1 of the present invention comprises the pipe joint unit 11 and the at least two pipes 12, and the pipes 12 communicate with the joint portions 111 of the pipe joint unit 11, respectively. In this way, the faucet pipe fitting assembly 1 of the present invention is equivalent to integrating at least two existing faucet pipes, thereby facilitating rapid communication between a valve seat 2 and the at least two pipes 12.

In the present invention, the pipe joint unit 11 and the respective pipes 12 may be formed in a single injection molding process. In this way, the pipe joint unit 11 and the respective pipes 12 may be made of the same material, and the faucet pipe fitting assembly 1 can be formed quickly.

In the present invention, the pipe joint unit 11 and the respective pipes 12 may be formed by in a two-shot injection molding process. In this way, the pipe joint unit 11 and the respective pipes 12 may be made of different materials to improve the flexibility of use of the faucet pipe fitting assembly 1. The pipe joint unit 11 is first formed by injection molding, and the respective pipes 12 are formed on the pipe joint unit 11 by secondary injection molding.

As shown in FIG. 1 through FIG. 9, the present invention further discloses a faucet connecting structure, comprising a valve seat 2 and the aforementioned faucet pipe fitting assembly 1. The valve seat 2 has valve seat ports 21 corresponding in number to the pipes 12 of the faucet pipe fitting assembly 1. The valve seat ports 21 each have an opening facing downward. The joint portions 111 of the pipe joint unit 11 of the faucet pipe fitting assembly 1 are inserted into the respective valve seat ports 21 of the valve seat 2 in a lower-to-upper direction. The pipe joint unit 11 is connected to the valve seat 2 through a connecting member 3. A sealing ring 4 may be provided between the outer wall of the joint portion 111 and the valve seat port 21 to prevent water leakage. The sealing ring 4 may be fitted in an annular groove 1111 of the outer wall of the joint portion 111.

In the present invention, when the faucet pipe fitting assembly 1 and the valve seat 2 are to be connected, the joint portions 111 of the pipe joint unit 11 of the faucet pipe fitting assembly 1 are first inserted into the respective valve seat ports 21 of the valve seat 2 in the lower-to-upper direction, and then the pipe joint unit 11 is connected to the valve seat 2 through the connecting member 3, so that the pipes 12 of the faucet pipe fitting assembly 1 and the valve seat 2 are kept connected. The connection between the faucet pipe fitting assembly 1 and the valve seat 2 of the present invention is easier. Because the faucet pipe fitting assembly 1 of the present invention is equivalent to integrating at least two existing faucet pipes, thereby facilitating rapid communication between the valve seat 2 and the at least two pipes 12, the present invention overcomes the problem of inconvenience in installation that the existing faucet pipes are connected to the valve seat one by one.

Figure 2:
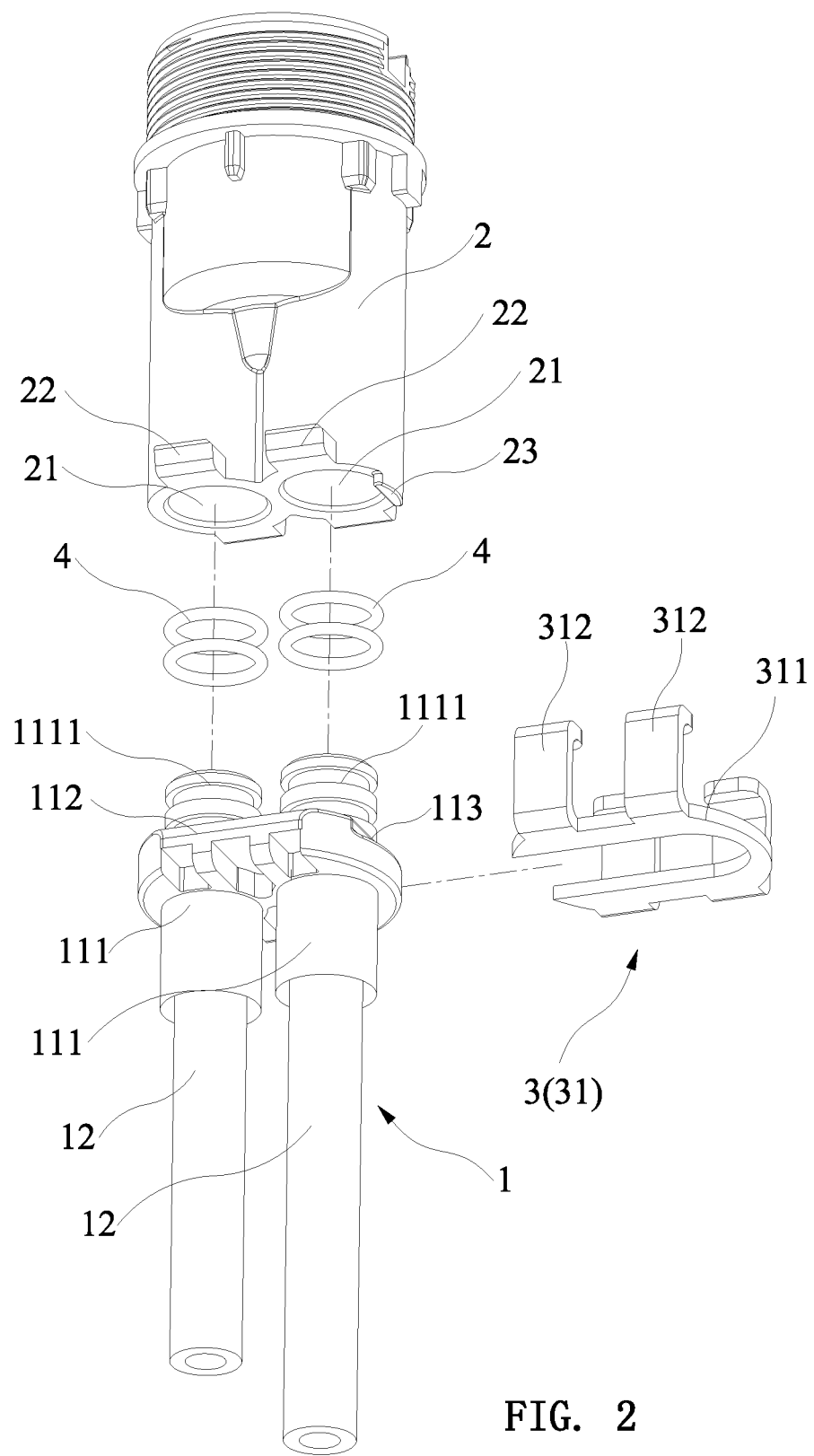
FIG. 2 is an exploded view of the faucet connecting structure according to the first embodiment of the present invention.
Figure 3:
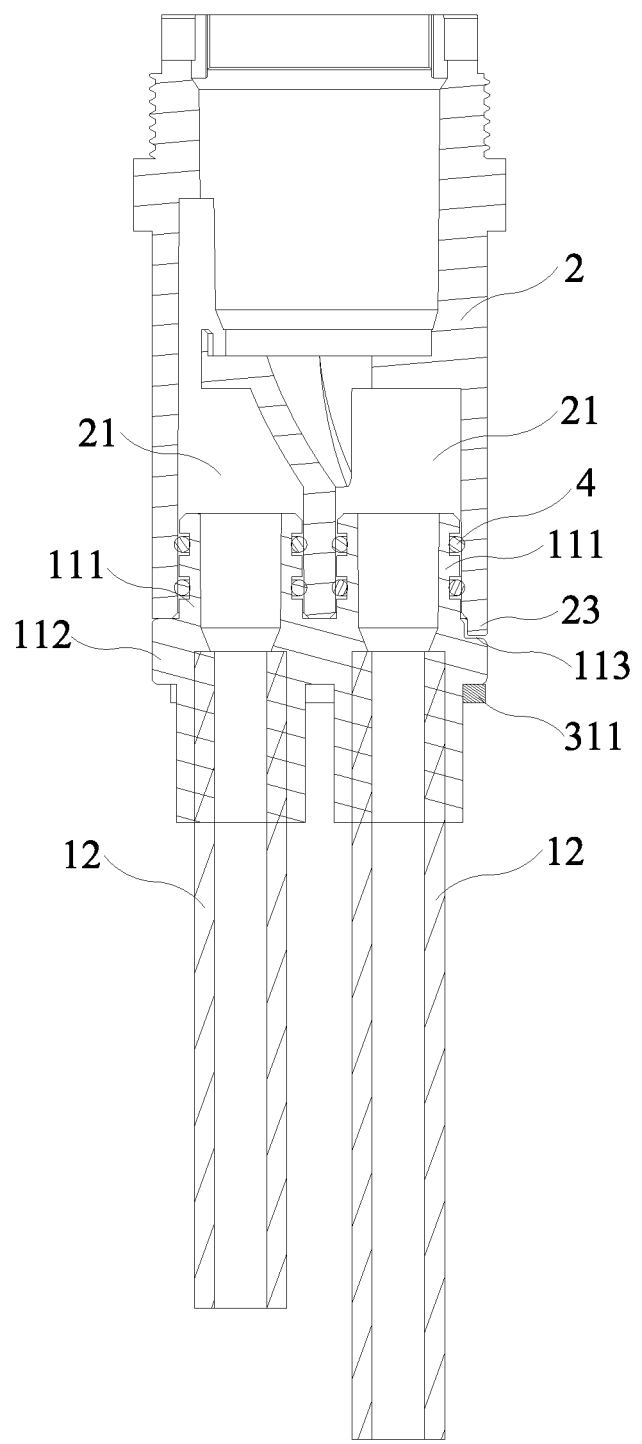
FIG. 3 is a cross-sectional view of the faucet connecting structure according to the first embodiment of the present invention.

As shown in FIGS. 1 to 3, in a first embodiment of the faucet connecting structure of the present invention, the connecting member 3 is a hook member 31. The hook member 31 includes an open ring 311 and at least two engaging hooks 312 connected to the open opening 311. The valve seat 2 has engaging portions 22 corresponding in number to the engaging hooks 312 of the hook member 31. The pipe joint unit 11 has a stop flange 112. When the hook member 31 connects the pipe joint unit 11 and the valve seat 2, the open ring 311 of the hook member 31 is sleeved on the pipe joint unit 11 and the open ring 311 abuts against the underside of the stop flange 112 of the pipe joint unit 11, and the engaging hooks 312 of the hook member 31 hook the tops of the engaging portions 22 of the valve seat 2, respectively. In this way, the hook member 31 restricts the vertical movement of the pipe joint unit 11 and the valve seat 2, so that faucet pipe fitting assembly 1 and the valve seat 2 are connected firmly. The hook member 31 is slid laterally, so that the open ring 311 is sleeved on the pipe joint unit 11, and the open ring 311 abuts against the underside of the stop flange 112 of the pipe joint unit 11, and the engaging hooks 312 of the hook member 31 hook the tops of the engaging portions 22 of the valve seat 2, respectively. The hook member 31 can connect the pipe joint unit 11 and the valve seat 2 very conveniently.

As shown in FIGS. 1 to 3, in the first embodiment of the faucet connecting structure of the present invention, the pipe joint unit 11 may have a positioning notch 113, and the valve seat 2 may have a positioning protrusion 23 to be inserted into the positioning notch 113. In the present invention, through the cooperation of the positioning notch 113 and the positioning protrusion 23, the joint portions 111 of the pipe joint unit 11 are inserted into the respective valve seat ports 21 of the valve seat 2 quickly and accurately.

Figure 4:
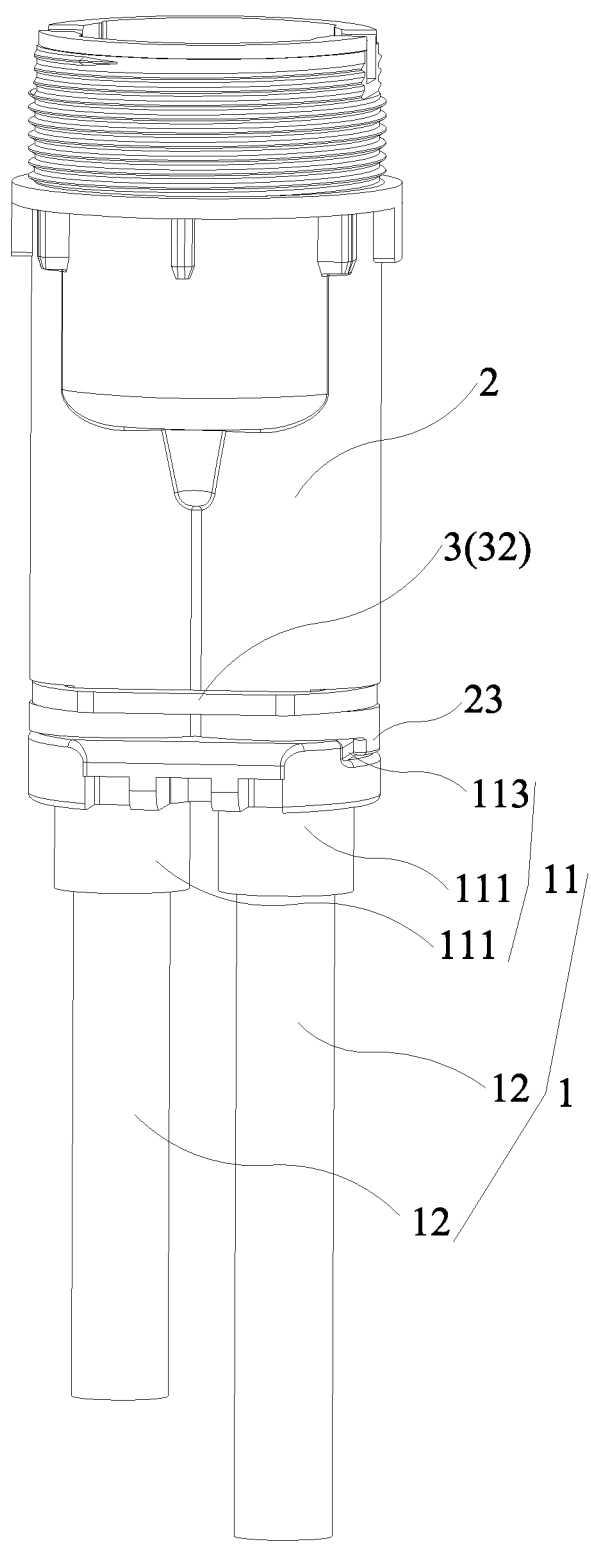
FIG. 4 is a schematic view of the faucet connecting structure according to a second embodiment of the present invention.
Figure 5:
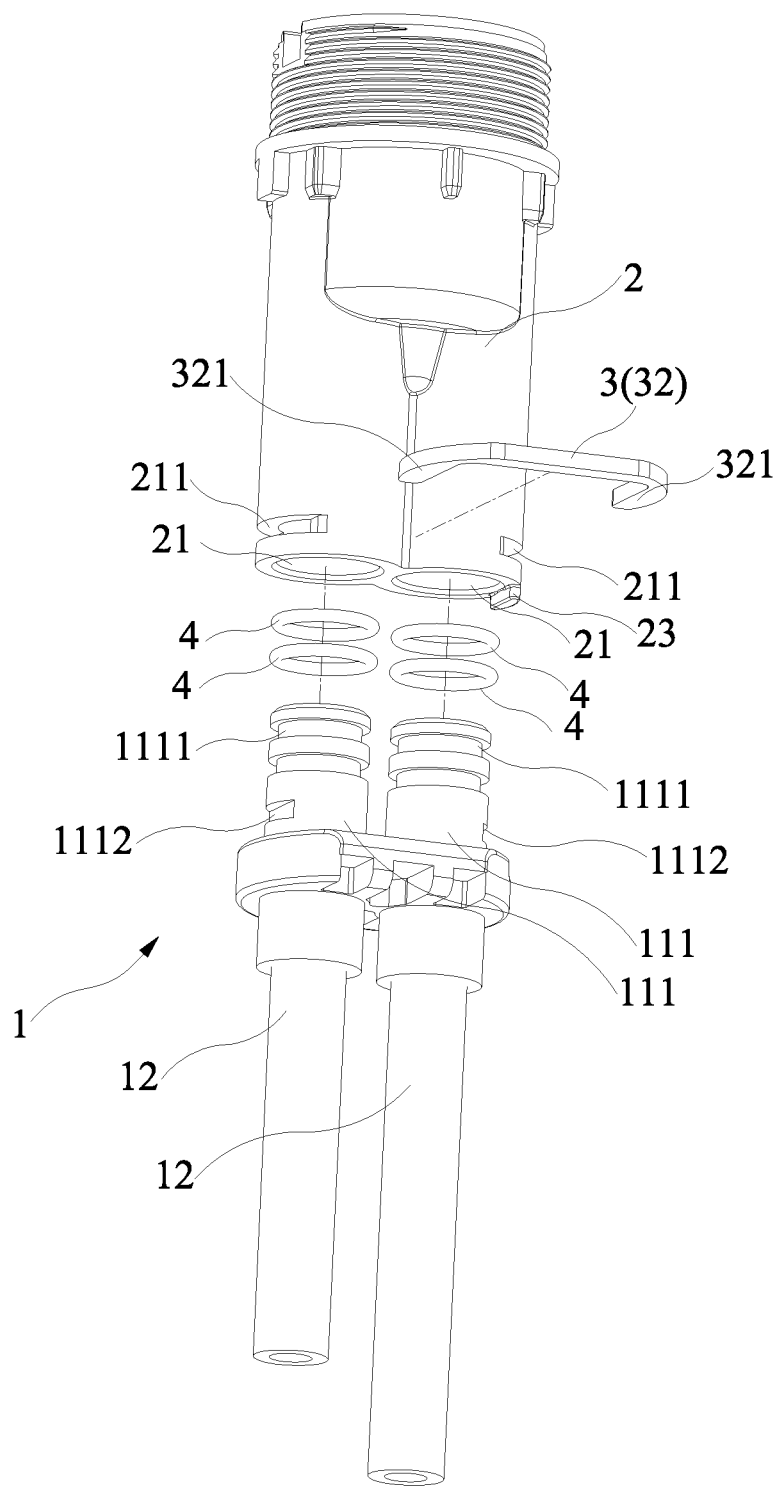
FIG. 5 is an exploded view of the faucet connecting structure according to the second embodiment of the present invention.
Figure 6:
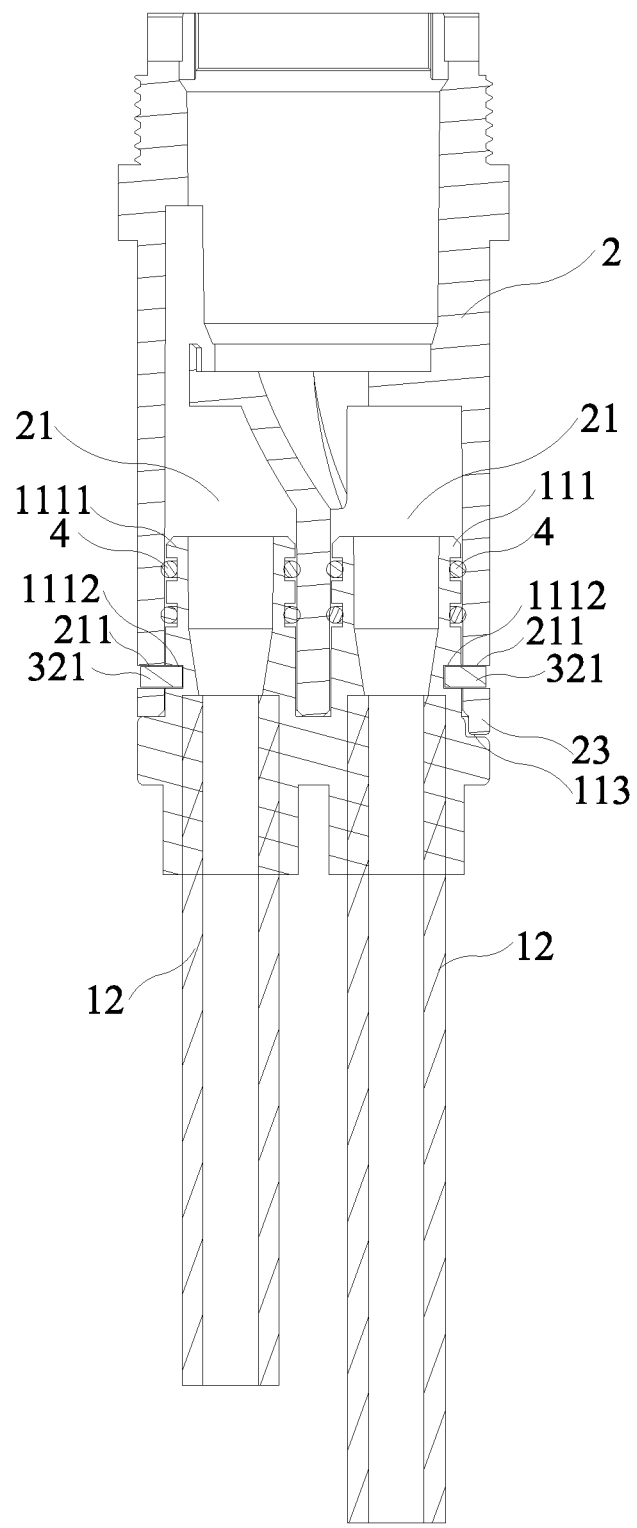
FIG. 6 is a cross-sectional view of the faucet connecting structure according to the second embodiment of the present invention.

As shown in FIGS. 4 to 6, in a second embodiment of the faucet connecting structure of the present invention, the connecting member 3 is a plug-in member 32. The plug-in member 32 has plug-in pieces 321 to be mated with the respective joint portions 111 of the pipe joint unit 11. The side wall of each joint portion 111 of the pipe joint unit 11 is formed with an engaging groove 1112.

The side wall of each valve seat port 21 of the valve seat 2 is formed with a receiving groove 211. When the connecting member 32 connects the pipe joint unit 11 and the valve seat 2, the plug-in pieces 321 of the plug-in member 32 are inserted into the engaging grooves 1112 of the joint portions 111 from the receiving grooves 211 of the valve seat ports 21. The plug-in member 32 restricts the vertical movement of the pipe joint unit 11 and the valve seat 2, so that faucet pipe fitting assembly 1 and the valve seat 2 are connected firmly. The plug-in pieces 321 of the plug-in member 32 may be arranged in the same direction. In this way, the plug-in member 32 slides laterally for the respective plug-in pieces 321 of the plug-in member 32 to be inserted into the engaging grooves 1112 of the joint portions 111 from the receiving grooves 211 of the valve seat ports 21. Therefore, the plug-in member 32 can connect the pipe joint unit 11 and the valve seat 2 very conveniently.

As shown in FIGS. 4 to 6, in the second embodiment of the faucet connecting structure of the present invention, the pipe joint unit 11 may have a positioning notch 113, and the valve seat 2 may have a positioning protrusion 23 to be inserted into the positioning notch 113.

Figure 7:
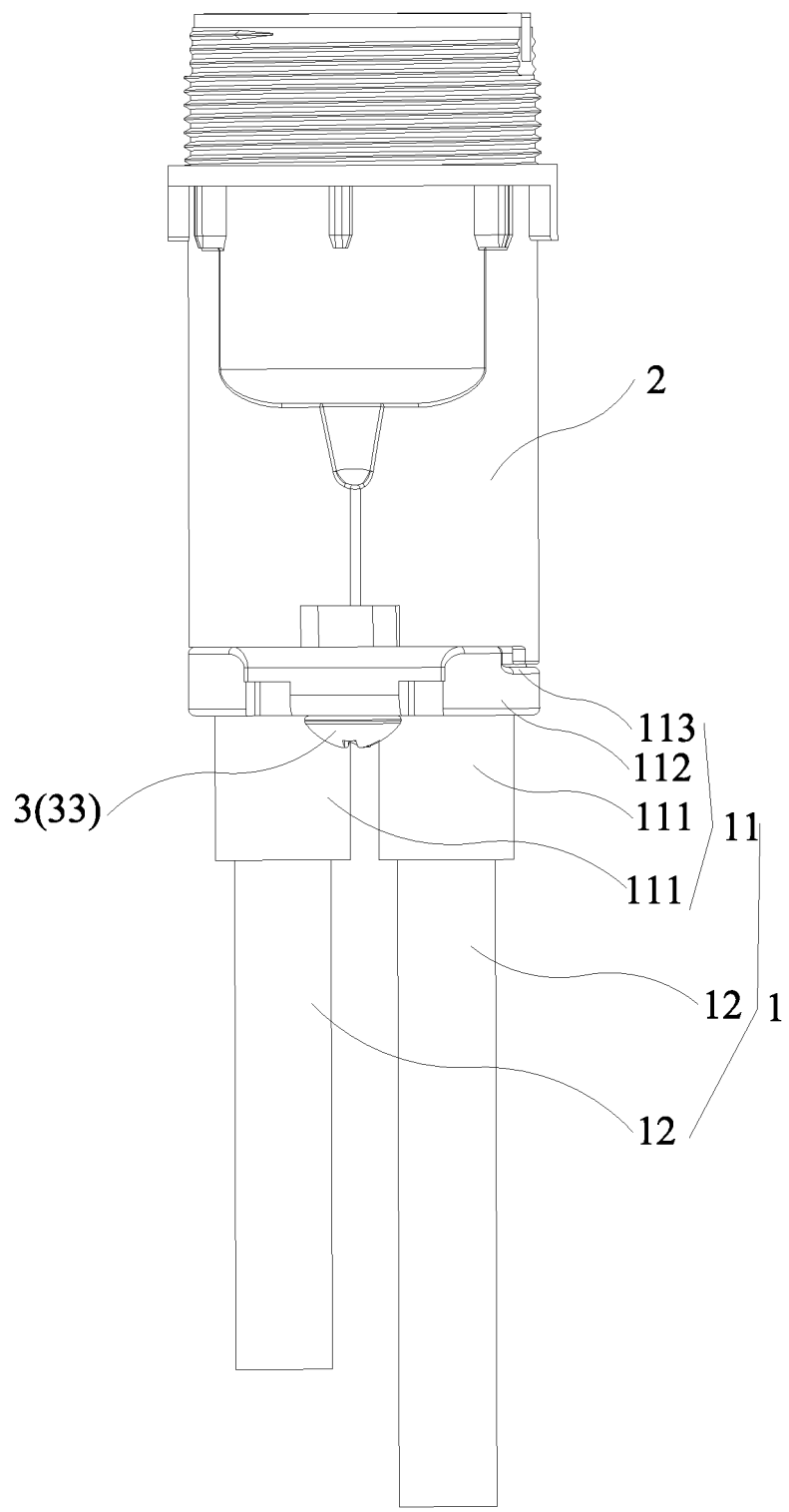
FIG. 7 is a schematic view of the faucet connecting structure according to a third embodiment of the present invention.
Figure 8:
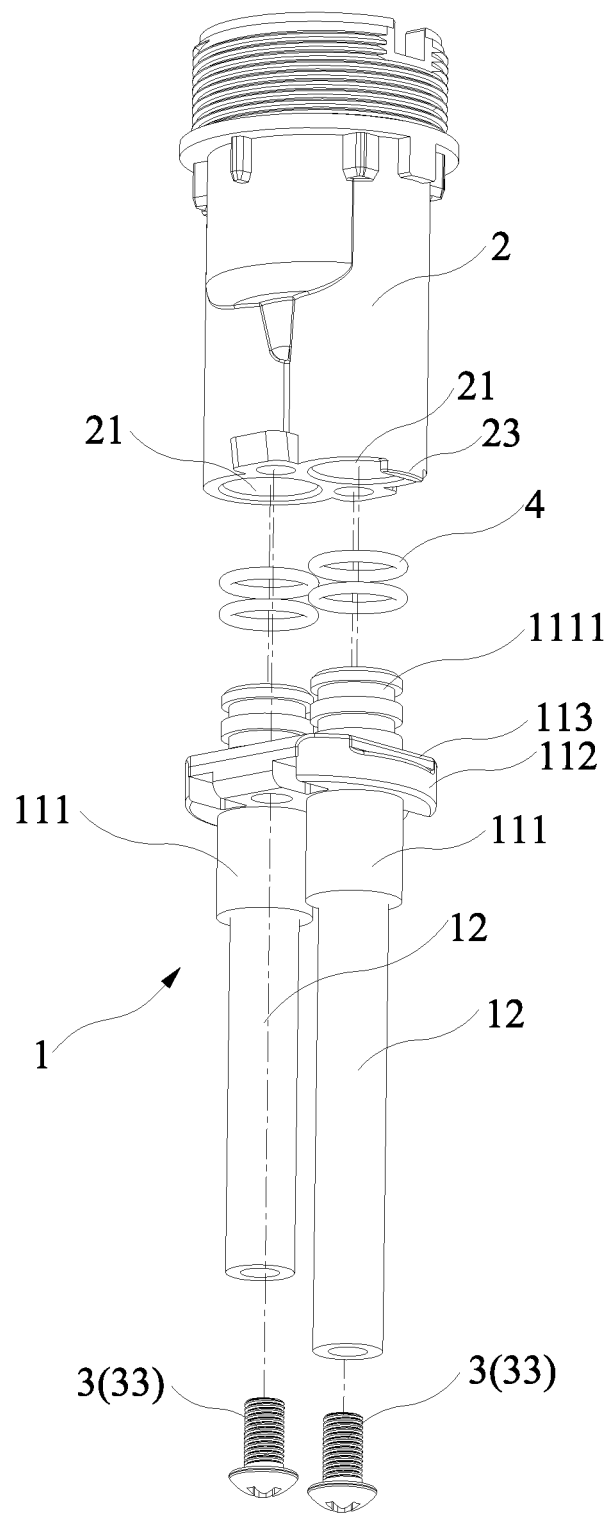
FIG. 8 is an exploded view of the faucet connecting structure according to the third embodiment of the present invention.
Figure 9:
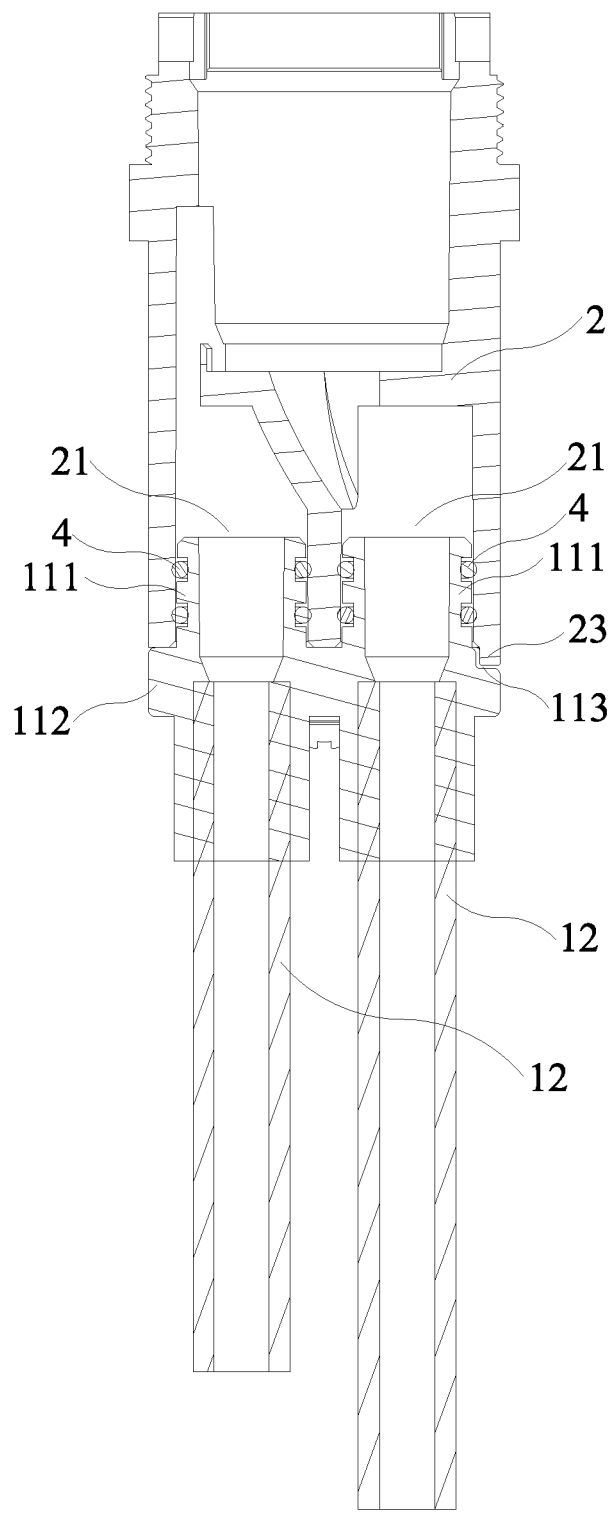
FIG. 9 is a cross-sectional view of the faucet connecting structure according to the third embodiment of the present invention.

As shown in FIGS. 7 to 9, in a third embodiment of the faucet connecting structure of the present invention, the connecting member 3 is a screw 33. The pipe joint unit 11 has a stop flange 12. The screw 33 is inserted through the stop flange 12 and locked to the valve seat 2, so that the screw 33 restricts the vertical movement of the pipe joint unit 11 and the valve seat 2.

As shown in FIGS. 7 to 9, in the third embodiment of the faucet connecting structure of the present invention, the pipe joint unit 11 may have a positioning notch 113, and the valve seat 2 may have a positioning protrusion 23 to be inserted into the positioning notch 113.

Figure 10:
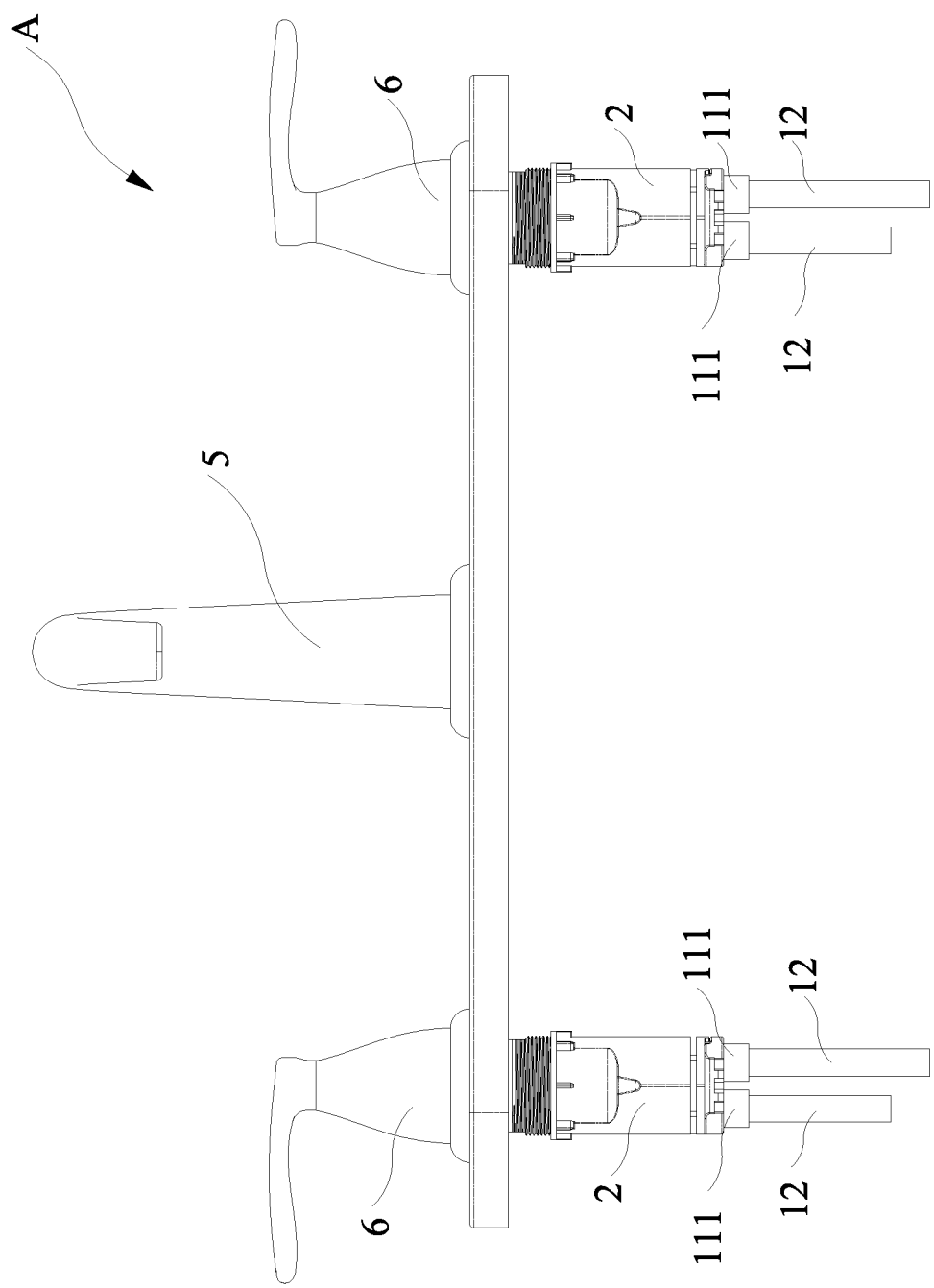
FIG. 10 is a schematic view of the structure of the faucet of the present invention.

As shown in FIG. 10, the present invention further discloses a faucet A, comprising the faucet connecting structure as described above. Because the faucet A has the faucet connecting structure as described above, the faucet A has the advantages of the faucet pipe fitting assembly 1 and the faucet connecting structure. Specifically, the faucet A may include a main body 5, two valve cores 6, and two faucet connecting structures as described above.

Each of the valve cores 6 is installed to the valve seat 2 of the faucet connecting structure as described above. The main body 5 covers the two valve cores 6.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A faucet connecting structure, comprising a valve seat and a faucet pipe fitting assembly;
   the faucet pipe fitting assembly comprising a pipe joint unit and at least two pipes, the pipe joint unit having joint portions corresponding in number to the pipes, the pipes being integrally formed with the pipe joint unit, the pipes communicating with the joint portions of the pipe joint unit, respectively;
   the valve seat having valve seat ports corresponding in number to the pipes of the faucet pipe fitting assembly, the valve seat ports each having an opening facing downward;
   the joint portions of the pipe joint unit of the faucet pipe fitting assembly being inserted into the respective valve seat ports of the valve seat in a lower-to-upper direction, the pipe joint unit being connected to the valve seat through a connecting member;
   wherein the connecting member is a hook member; the hook member includes an open ring and at least two engaging hooks connected to the open opening;
   the valve seat has engaging portions corresponding in number to the engaging hooks of the hook member; the pipe joint unit has a stop flange;
   the open ring of the hook member is sleeved on the pipe joint unit and the open ring abuts against an underside of the stop flange of the pipe joint unit, and the engaging hooks of the hook member hook tops of the engaging portions of the valve seat, respectively.

2. The faucet connecting structure as claimed in claim 1, wherein a side wall of each joint portion of the pipe joint unit of the faucet pipe fitting assembly is formed with an engaging groove;
   a side wall of each valve seat port of the valve seat is formed with a receiving groove;
   the connecting member is a plug-in member, the plug-in member has plug-in pieces to be mated with the respective joint portions of the pipe joint unit, and the plug-in pieces of the plug-in member are inserted into the engaging grooves of the joint portions from the receiving grooves of the valve seat ports, respectively.

3. The faucet connecting structure as claimed in claim 2, wherein the plug-in pieces of the plug-in member are arranged in a same direction.

4. The faucet connecting structure as claimed in claim 1, wherein the connecting member is a screw, the pipe joint unit has a stop flange, and the screw is inserted through the stop flange and locked to the valve seat.

5. The faucet connecting structure as claimed in claim 1, wherein the pipe joint unit has a positioning notch, and the valve seat has a positioning protrusion to be inserted into the positioning notch.

6. A faucet, comprising the faucet connecting structure as claimed in claim 1.

* * * * *